(12) United States Patent
Neely et al.

(10) Patent No.: US 12,049,606 B2
(45) Date of Patent: Jul. 30, 2024

(54) COMPOSITIONS FOR OPHTHALMOLOGIC DEVICES

(71) Applicant: Johnson & Johnson Vision Care, Inc., Jacksonville, FL (US)

(72) Inventors: Frank Neely, Jacksonville, FL (US); Donald E. Riederer, Jacksonville, FL (US); Jeffrey Wegrzyn, Saint Johns, FL (US)

(73) Assignee: Johnson & Johnson Vision Care, Inc., Jacksonville, CA (US)

( * ) Notice: Subject to any disclaimer, the term of this patent is extended or adjusted under 35 U.S.C. 154(b) by 212 days.

(21) Appl. No.: 17/546,434

(22) Filed: Dec. 9, 2021

(65) Prior Publication Data

US 2022/0220417 A1   Jul. 14, 2022

Related U.S. Application Data

(60) Provisional application No. 63/136,370, filed on Jan. 12, 2021.

(51) Int. Cl.
| | |
|---|---|
| *C11D 3/00* | (2006.01) |
| *C11D 3/04* | (2006.01) |
| *C11D 3/06* | (2006.01) |
| *C11D 3/43* | (2006.01) |

(52) U.S. Cl.
CPC ............ *C11D 3/0078* (2013.01); *C11D 3/042* (2013.01); *C11D 3/046* (2013.01); *C11D 3/06* (2013.01); *C11D 3/43* (2013.01)

(58) Field of Classification Search
CPC .................................. C11D 3/046; C11D 3/06
See application file for complete search history.

(56) References Cited

U.S. PATENT DOCUMENTS

| | | |
|---|---|---|
| 3,408,429 A | 10/1968 | Wichterle |
| 3,660,545 A | 5/1972 | Wichterle |
| 4,113,224 A | 9/1978 | Clark et al. |
| 4,197,266 A | 4/1980 | Clark et al. |
| 4,495,313 A | 1/1985 | Larsen |
| 4,659,782 A | 4/1987 | Spinelli |
| 4,659,783 A | 4/1987 | Spinelli |
| 4,889,664 A | 12/1989 | Kindt-Larsen et al. |
| 5,039,459 A | 8/1991 | Kindt-Larsen et al. |

(Continued)

FOREIGN PATENT DOCUMENTS

| | | |
|---|---|---|
| EP | 0241737 A2 | 10/1987 |
| EP | 0358447 A2 | 3/1990 |

(Continued)

OTHER PUBLICATIONS

Britton H.T.S., et al., "CXCVIII. Universal Buffer Solutions and the Dissociation Constant of Veronal," Journal of the Chemical Society, 1931, pp. 1456-1462.

(Continued)

*Primary Examiner* — Necholus Ogden, Jr.
(74) *Attorney, Agent, or Firm* — Johnson & Johnson Surgical Vision, Inc.

(57) ABSTRACT

The present invention relates to borate and phosphate containing compositions, especially eye care compositions, achieving physiologically compatible pH and tonicity as well as good bacteriostatic properties. Methods of using the compositions of the present invention are also disclosed.

12 Claims, 6 Drawing Sheets

S. aureus (CFU/Day)

(56) References Cited

U.S. PATENT DOCUMENTS

| | | | |
|---|---|---|---|
| 5,244,981 A | 9/1993 | Seidner et al. |
| 5,271,875 A | 12/1993 | Appleton et al. |
| 5,314,960 A | 5/1994 | Spinelli et al. |
| 5,331,067 A | 7/1994 | Seidner et al. |
| 5,371,147 A | 12/1994 | Spinelli et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,849,811 A | 12/1998 | Nicolson et al. |
| 5,965,631 A | 10/1999 | Nicolson et al. |
| 5,998,498 A | 12/1999 | Vanderlaan et al. |
| 6,087,415 A | 7/2000 | Vanderlaan et al. |
| 6,367,929 B1 | 4/2002 | Maiden et al. |
| 6,440,366 B1 | 8/2002 | Salpekar et al. |
| 6,822,016 B2 | 11/2004 | McCabe et al. |
| 6,867,245 B2 | 3/2005 | Iwata et al. |
| 6,943,203 B2 | 9/2005 | Vanderlaan et al. |
| 7,247,692 B2 | 7/2007 | Laredo |
| 7,249,848 B2 | 7/2007 | Laredo et al. |
| 7,553,880 B2 | 6/2009 | Nicolson et al. |
| 7,666,921 B2 | 2/2010 | McCabe et al. |
| 7,786,185 B2 | 8/2010 | Rathore et al. |
| 7,956,131 B2 | 6/2011 | Arnold et al. |
| 8,022,158 B2 | 9/2011 | Rathore et al. |
| 8,273,802 B2 | 9/2012 | Laredo et al. |
| 8,399,538 B2 | 3/2013 | Steffen et al. |
| 8,450,387 B2 | 5/2013 | McCabe et al. |
| 8,470,906 B2 | 6/2013 | Rathore et al. |
| 8,487,058 B2 | 7/2013 | Liu et al. |
| 8,507,577 B2 | 8/2013 | Zanini et al. |
| 8,637,621 B2 | 1/2014 | Iwata et al. |
| 8,703,891 B2 | 4/2014 | Broad |
| 8,937,110 B2 | 1/2015 | Alli et al. |
| 8,937,111 B2 | 1/2015 | Alli et al. |
| 8,940,812 B2 | 1/2015 | Reboul et al. |
| 9,056,878 B2 | 6/2015 | Fujisawa et al. |
| 9,057,821 B2 | 6/2015 | Broad et al. |
| 9,125,808 B2 | 9/2015 | Alli et al. |
| 9,140,825 B2 | 9/2015 | Alli et al. |
| 9,156,934 B2 | 10/2015 | Alli et al. |
| 9,170,349 B2 | 10/2015 | Mahadevan et al. |
| 9,244,196 B2 | 1/2016 | Scales et al. |
| 9,244,197 B2 | 1/2016 | Alli et al. |
| 9,260,544 B2 | 2/2016 | Rathore et al. |
| 9,297,928 B2 | 3/2016 | Molock et al. |
| 9,297,929 B2 | 3/2016 | Scales et al. |
| 2008/0138310 A1 | 6/2008 | Ketelson et al. |
| 2010/0048847 A1 | 2/2010 | Broad |
| 2021/0393698 A1* | 12/2021 | Shpall .................. A61K 45/06 |

FOREIGN PATENT DOCUMENTS

| | | |
|---|---|---|
| EP | 1473584 A1 | 11/2004 |
| WO | WO 99/24541 A1 | 5/1999 |
| WO | WO 03/22321 A2 | 3/2003 |
| WO | WO 2008/061992 A2 | 5/2008 |
| WO | WO 2008/109598 A2 | 9/2008 |

OTHER PUBLICATIONS

Houlsby R.D., et al.; "Antimicrobial activity of borate-buffered solutions"; Antimicrobial Agents and Chemotherapy, American Society for Microbiology, vol. 29, No. 5, May 1, 1986, pp. 803-806.

Lehmann, David M., et al.; "Nonclinical safety evaluation of boric acid and a novel borate-buffered contact lens multi-purpose solution, Biotrue multi-purpose solution"; Contact Lens and Anterior Eye, vol. 33, May 1986, pp. S24-S32.

Extended Search Report—EP 22151036.5-1110, dated May 25, 2022.

* cited by examiner

*P. aeruginosa* Daily Log Reduction

Day 3 *P. aeruginosa* % Population Count Reduction

COMPOSITIONS FOR OPHTHALMOLOGIC DEVICES

RELATED APPLICATIONS

The present application claims the benefit of U.S. provisional patent application 63/136,370, filed Jan. 12, 2021, the entirety of which application is hereby incorporated by reference herein as if fully set forth herein.

FIELD OF TECHNOLOGY

The present invention relates to borate and phosphate containing compositions, especially eye care compositions, achieving physiologically compatible pH and tonicity as well as good bacteriostatic properties. Methods of using the compositions of the present invention are also disclosed.

BACKGROUND OF THE INVENTION

Contact lenses are generally provided to consumers as individually packaged products. The single unit containers which package such contact lenses typically use buffered saline or deionized water as storage or packaging solutions.

Such packaging solutions should provide for, at least in some cases, a short-term period—e.g., between solution preparation and sterilization of the end-staged packaged product—an environment that does not facilitate the growth of harmful or undesirable microorganisms. Moreover, the packaging solutions should be gentle to the eye since at least some of the packaging solution will, most likely, remain on a contact lens once it is removed from the packaging solution and placed directly on (i.e., by direct application to) the eye.

The contact lens (or other ophthalmic device) packaging solution should also be compatible with the materials forming the contact lens (or other ophthalmic device).

A challenge in preparing packaging solutions for ophthalmic devices is formulating solutions which do not negatively affect eye comfort or the solution's compatibility with the material(s) forming the ophthalmic device. One important component of ophthalmic compositions, including packaging solutions, is the buffer incorporated, which helps to maintain the pH of the composition within an acceptable physiological range.

A benefit to using boric acid/borate as the buffer relates to its unique ability to maintain formulation (to which it is added) pH near physiological pH (~7) with a secondary impact of imparting at, low concentrations, bacteriostatic (as opposed to bactericidal) characteristics to formulations. Such "static" characteristics reduce the potential for eye irritation. Reduced concentrations of boric acid/borate, however, tend to also sacrifice its efficacy against certain microorganisms (e.g., *Pseudomonas aeruginosa*).

Phosphates are also known to be capable buffers, but, unfortunately, phosphates are also known promoters of microbial growth.

The present inventors have discovered that by appropriately combining boric acid/borate and phosphate buffers, adequately buffered, bacteriostatic compositions (e.g., packaging solutions) can be achieved. More specifically, such buffered solutions can be achieved by combining boric acid/borate with phosphates at specific ratios of boric acid/borate to phosphate buffers—as detailed below.

SUMMARY OF THE INVENTION

Figure 1:
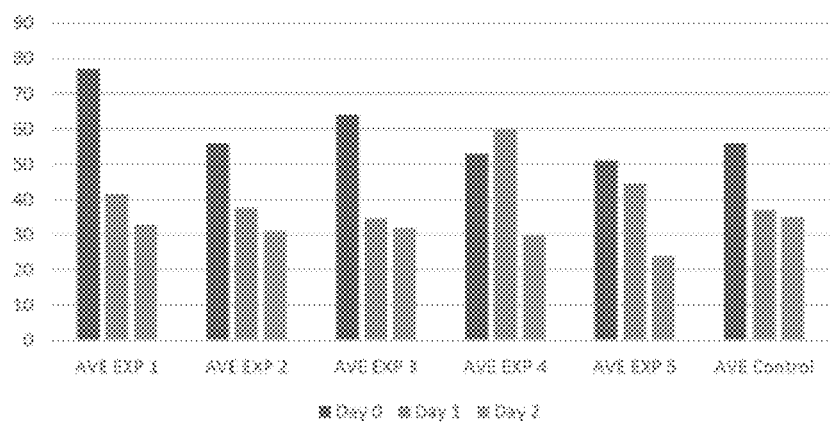
FIG. 1 is a graph showing microbial colony forming units (CFU) of *Staphylococcus aureus* present at Day 0, 1 and 2 of challenge with certain compositions of the present invention.
Figure 2:
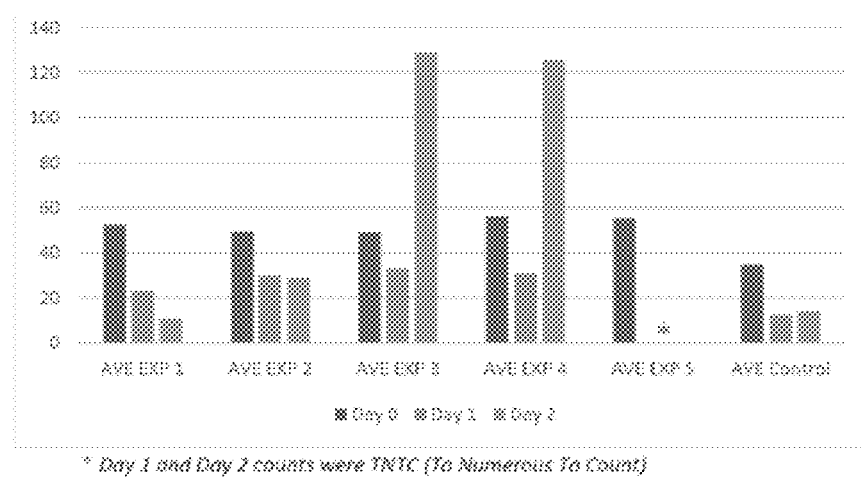
FIG. 2 is a graph showing microbial colony forming units (CFU) of *Pseudomonas aeuroginosa* present at Day 0, 1 and 2 of challenge with certain compositions of the present invention.
Figure 3:
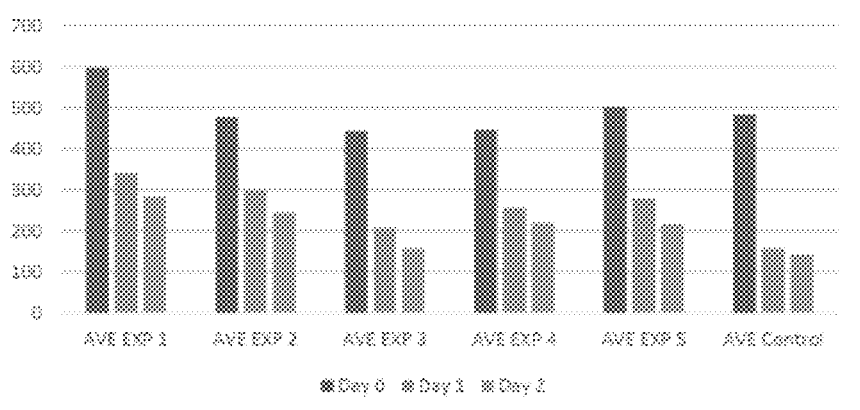
FIG. 3 is a graph showing microbial colony forming units (CFU) of *Escherichia coli* present at Day 0, 1 and 2 of challenge with certain compositions of the present invention.
Figure 4:
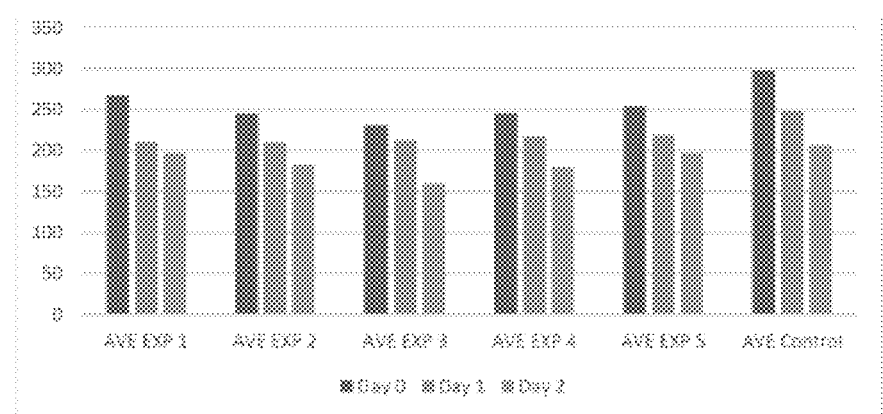
FIG. 4 is a graph showing microbial colony forming units (CFU) of *Bacillus subtilis* present at Day 0, 1 and 2 of challenge with certain compositions of the present invention.
Figure 5:
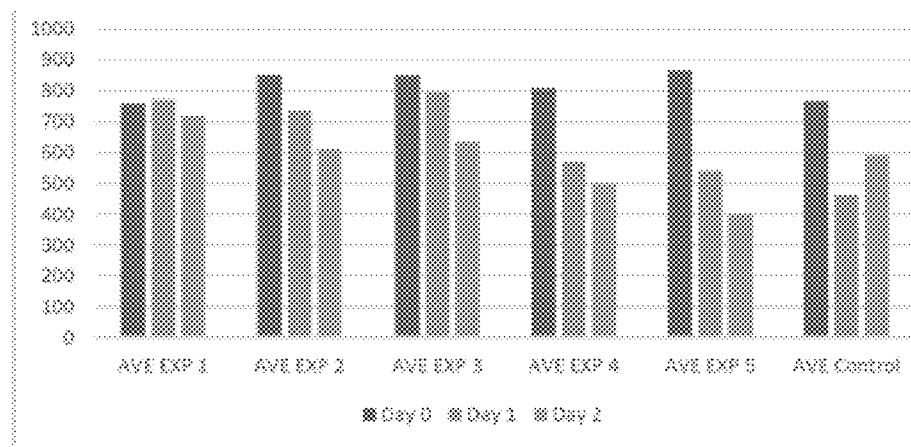
FIG. 5 is a graph showing microbial colony forming units (CFU) of *Salmonella typhimurium* present at Day 0, 1 and 2 of challenge with certain compositions of the present invention.
Figure 6:
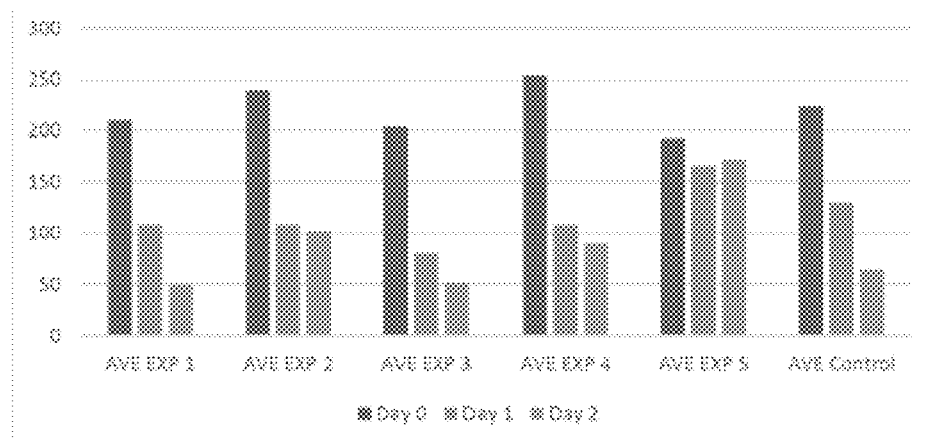
FIG. 6 is a graph showing microbial colony forming units (CFU) of *Candida albicans* present at Day 0, 1 and 2 of challenge with certain compositions of the present invention.
Figure 7:
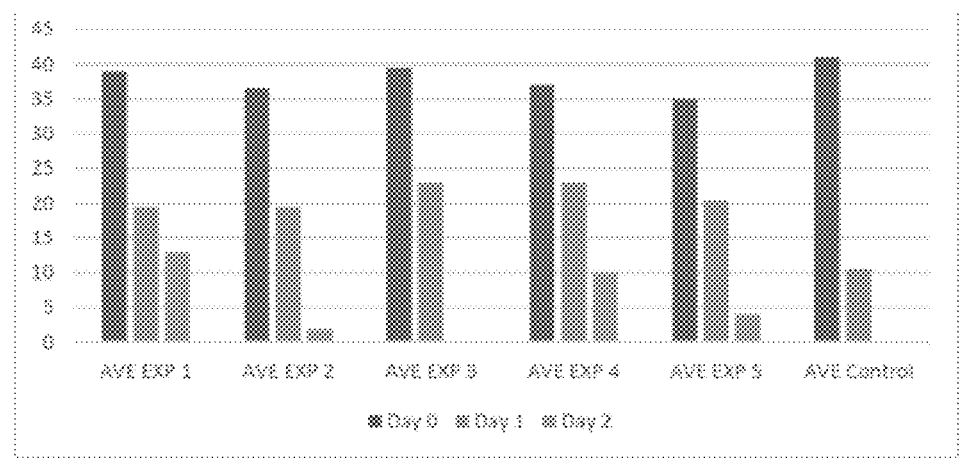
FIG. 7 is a graph showing microbial colony forming units (CFU) of *Aspergillus brasilensis* present at Day 0, 1 and 2 of challenge with certain compositions of the present invention.
Figure 8:
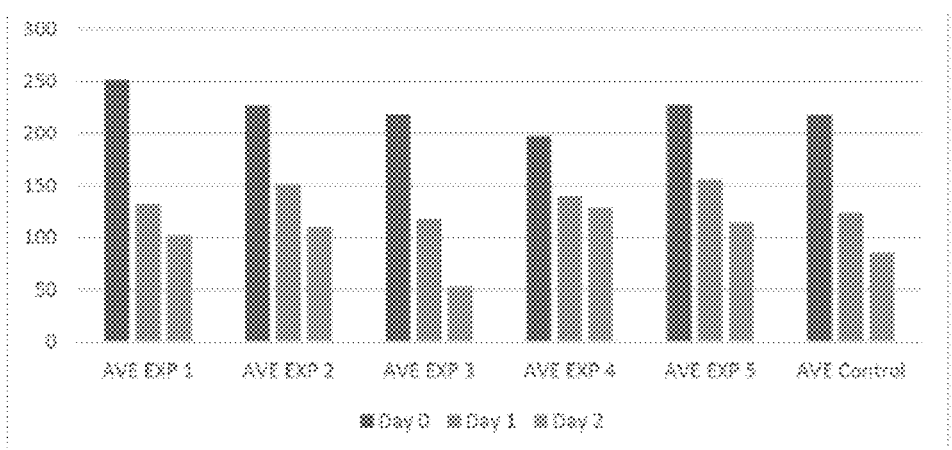
FIG. 8 is a graph showing microbial colony forming units (CFU) of *Fusarium keratoplasticum* present at Day 0, 1 and 2 of challenge with certain compositions of the present invention.

The present invention relates to compositions, comprising:
a. from about 0.1% w/v to less than or equal to about 0.80% w/v of a borate compound;
b. from about 0.3% w/v to about 0.9% w/v of a phosphate compound; and
c. ophthalmologically acceptable carrier wherein the concentration of the phosphate compound is at least about 1.5 times the amount of the borate compound on weight basis.

The present invention also relates to methods of making and using the disclosed compositions.

DETAILED DESCRIPTION OF THE INVENTION

As indicated above, the present invention relates to compositions comprising a borate compound and a phosphate compound as an ophthalmologically acceptable carrier.

The compositions may be useful for storing or as a packaging solution for ophthalmic devices.

The compositions may be useful for direct application to the eyes for an eye care benefit such as relieving eye discomfort.

The compositions and methods of the present invention can comprise, consist of, or consist essentially of the steps, essential elements and limitations of the invention described herein, as well any of the additional or optional ingredients, components, or limitations described herein. The term "comprising" (and its grammatical variations) as used herein is used in the inclusive sense of "having" or "including" and not in the exclusive sense of "consisting only of." The terms "a" and "the" as used herein are understood to encompass the plural as well as the singular.

Unless otherwise indicated, all documents cited are, in relevant part, incorporated herein by reference; the citation of any document is not to be construed as an admission that it is prior art with response to the present invention. Furthermore, all documents incorporated herein by reference are only incorporated herein to the extent that they are not inconsistent with this specification.

The present invention as disclosed herein may be practiced in the absence of any compound or element (or group of compounds or elements) which is not specifically disclosed herein.

As used herein, "pharmaceutically acceptable" means biologically tolerable, and otherwise biologically suitable for application or exposure to the eyes and surrounding tissues of the eyes without undue adverse effects such as toxicity, incompatibility, instability, irritation, allergic response and the like.

All percentages, parts and ratios are based upon the total weight of the composition of the present invention, unless otherwise specified. All such weights as they pertain to the listed ingredients are based on the active level and, therefore, do not include carriers or by-products that may be included in commercially available materials, unless otherwise specified.

The Borate Compound

The compositions of the present invention comprise a borate. As used herein, the term "borate" shall refer to boric acid, salts of boric acid and other pharmaceutically acceptable borates, or combinations thereof. Suitable borates include, but are not limited to, boric acid; pharmaceutically acceptable salts, such as alkaline metal salts such as sodium borate, potassium borate; alkaline earth metal salts such as calcium borate, magnesium borate; transition metal salts such as manganese borate; and mixtures thereof.

The borate compound can be present in the compositions at concentrations of from about 0.1%, preferably from about 0.2%, preferably from about 0.25%, w/v to less than or equal to 0.80% (or about 0.80%), preferably 0.7% (or about 0.7%), preferably 0.6% (or about 0.6%), preferably 0.5% (or about 0.5%), preferably 0.45% (or about 0.45%), preferably 0.4% (or about 0.4%), preferably 0.35% (or about 0.35%), preferably 0.3% (or about 0.3%), w/v, in each case, of the total composition. The borate compound may be present in the compositions at concentrations of from about 0.1% w/v to less than or equal to 0.40% (or about 0.40%) w/v, preferably from about 0.2% w/v to less than or equal to 0.35% (or about 0.35%) w/v, or preferably from about 0.25% w/v to less than or equal to 0.30% (or about 0.30%) w/v of the total composition.

The Phosphate Compound

The compositions of the present invention comprise a phosphate compound. As used herein, the term "phosphate" shall refer to phosphoric acid, salts of phosphoric acid and other pharmaceutically acceptable phosphates, or combinations thereof. Suitable phosphates may be incorporated as one or more monobasic phosphates, dibasic phosphates and the like. Examples of phosphate compounds useful in the compositions are those selected from pharmaceutically acceptable phosphate salts of alkali and/or alkaline earth metals. The phosphate compound may include one or more of sodium dibasic phosphate ($Na_2HPO_4$), sodium monobasic phosphate ($NaH_2PO_4$), and potassium monobasic phosphate ($KH_2PO_4$).

The phosphate compound can be present in the compositions at concentrations of from 0.3% (or about 0.3%) w/v to 0.9% (or about 0.9%) w/v, preferably from 0.4% (or about 0.4%) w/v to 0.85% (or about 0.85%) w/v, preferably from 0.5% (or about 0.5%) w/v to 0.8% (or about 0.8%) w/v or preferably from 0.6% (or about 0.6%) w/v to 0.75% (or about 0.75%) w/v of the total composition.

The concentration of the phosphate compound may be at least 1.5 (or about 1.5), preferably at least 2.0 (or about 2.0), and preferably at least 2.5 (or about 2.5), but up to 4, preferably up to 3, times the amount of the borate compound on a weight basis.

The ratio of the phosphate compound to the borate compound may be from 1.5:1 (or about 1.5:1) to 3:1 (or about 3:1) preferably from 2:1 (or about 2:1) to 3:1 (or about 3:1) or preferably 2:1 (or about 2:1) on a weight basis.

An Ophthalmologically Acceptable Carrier

The compositions of the present invention comprise an ophthalmologically acceptable carrier. The ophthalmologically acceptable carrier may be water or an aqueous excipient solution. The term "aqueous" typically denotes a formulation wherein the excipient is at least about 50%, more preferably at least about 75% and in particular at least about 90% and up to about 95% or preferably about 99%, by weight, water. The water is distilled water. The carrier may be free of $C_{1-4}$ alcohols such as methanol, ethanol, propanol, isopropanol, butanol, and the like which can sting, irritate, or otherwise cause discomfort to the eye.

The water may be present in the ophthalmologically acceptable carrier at concentrations of from about 96% to about 99.9%, preferably, from about 98% to about 99.5%, or preferably, from about 99.0% to about 99.5% by weight of the total composition.

The ophthalmologically acceptable carrier may be present at concentrations of from about 96% to about 99.5%, preferably, from about 98% to about 99.5%, or preferably, from about 98.5% to about 99.2% by weight of the total composition.

The compositions may be sterile, namely such that the absence of microbial contaminants in the product prior to release or use are statistically demonstrated to the degree necessary for such products. The compositions may be selected to have no or substantially no detrimental, negative, harmful effect on the contact lens being therein or on the eye (or on the region around the eye).

The compositions according to the present invention are physiologically compatible with the eye and ophthalmic devices. Specifically, the composition should be "ophthalmologically safe" for use with an ophthalmic device such as a contact lens, meaning that a contact lens treated with the solution is generally suitable and safe for direct placement on or direct application to the eye without rinsing, that is, the solution is safe and comfortable for ophthalmic devices, of any frequency of application, wetted with the solution, including contact lenses of any wear frequency. An ophthalmologically safe composition has a tonicity and pH that is compatible with the eye and includes materials, and amounts thereof, that are ophthalmically compatible and non-cytotoxic according to ISO standards and U.S. Food & Drug Administration (FDA) regulations.

The compositions of the present invention may be adjusted with tonicity agents, to approximate the osmotic pressure of normal lacrimal fluids, which is equivalent to a 0.9 percent solution of sodium chloride or 2.5 percent of glycerol solution. The compositions may be made substantially isotonic with physiological saline used alone or in combination with other tonicity agents such as glycerol, otherwise if simply blended with sterile water and made hypotonic or made hypertonic the ophthalmic devices such as contact lenses may lose their desirable optical parameters. Correspondingly, excess saline may result in the formation of a hypertonic composition, which will cause stinging, and eye irritation. The osmolality of the composition may be at least about 200 mOsm/kg, preferably from about 200 to about 450 mOsm/kg, preferably from about 205 to about 380 mOsm/kg, preferably from about 210 to about 360 milliosmoles per kilogram (mOsm/kg), preferably from about 250 to about 350 mOsm/kg, or, preferably, from about 300 to about 330 mOsm/kg. The ophthalmic compositions will generally be formulated as sterile aqueous compositions.

Examples of suitable tonicity adjusting agents include, but are not limited to, glycerin, sodium, potassium, calcium, zinc and magnesium chloride, alkali metal halides, dextrose, and the like and mixtures thereof. These agents may be used individually in amounts ranging from about 0.01 to about 2.5% w/v and preferably from about 0.2 to about 1.5% w/v.

The tonicity adjusting agent may be sodium chloride which can be incorporated at concentrations of from about 0.4 to about 0.9, preferably, from about 0.4 to about 0.7, or preferably, from about 0.5% to about 0.6% by weight of the total composition.

The compositions of the present invention may have a pH of from about 5.0 to a pH of about 8.0, preferably a pH of from about 6.5 to a pH of about 8.0, preferably a pH of from about 6.5 to a pH of about 7.5, preferably a pH of about 7. Compositions (as noted above) may preferably have a pH matching the physiological pH of the human tissue to which the composition will contact or be directly applied.

The pH of the ophthalmic composition may be adjusted using acids and bases, such as mineral acids, such as, but not limited to hydrochloric acid and bases such as sodium hydroxide.

The compositions of the present invention are also useful as packaging solutions for packaging of ophthalmic devices and for storing such ophthalmic devices.

As used herein, "ophthalmic device" refers to an object that resides in or on the eye. These devices can provide optical correction or may be cosmetic. Ophthalmic devices include but are not limited to soft contact lenses, intraocular lenses, overlay lenses, ocular inserts, punctual plugs, and optical inserts. The ophthalmic device may be a contact lens. Contact lenses useful with the compositions can be manufactured employing various conventional techniques, to yield a shaped article having the desired posterior and anterior lens surfaces. Spincasting methods are disclosed in U.S. Pat. Nos. 3,408,429 and 3,660,545; static casting methods are disclosed in U.S. Pat. Nos. 4,113,224, 4,197, 266, and 5,271,875, each of which are herein incorporated by reference. Contact lens polymer materials useful for manufacturing suitable contact lenses include, but are not limited to, acofilcon A, alofilcon A, alphafilcon A, amifilcon A, astifilcon A, atalafilcon A, balafilcon A, bisfilcon A, bufilcon A, comfilcon A, crofilcon A, cyclofilcon A, darfilcon A, deltafilcon A, delefilcon, deltafilcon B, dimefilcon A, drooxifilcon A, epsifilcon A, esterifilcon A, etafilcon A, fanfilcon A, focofilcon A, galyfilcon A, genfilcon A, govafilcon A, hefilcon A, hefilcon B, hefilcon D, hilafilcon A, hilafilcon B, hioxifilcon B, hioxifilcon C, hixoifilcon A, hydrofilcon A, lenefilcon A, licryfilcon A, licryfilcon B, lidofilcon A, lidofilcon B, lotrafilcon A, lotrafilcon B, mafilcon A, mesifilcon A, methafilcon B, mipafilcon A, narafilcon A, narafilcon B, nelfilcon A, netrafilcon A, ocufilcon A, ocufilcon B, ocufilcon C, ocufilcon D, ocufilcon E, ofilcon A, omafilcon A, oxyfilcon A, pentafilcon A, perfilcon A, pevafilcon A, phemfilcon A, polymacon, riofilcon A, samfilcon A, senofilcon A, senofilcon C, silafilcon A, siloxyfilcon A, somofilcon A, stenfilcon A, tefilcon A, tetrafilcon A, trifilcon A, vasurfilcon, vifilcon, and xylofilcon A. Prefereably, the contact lenses are manufactured using polymer materials selected from (or selected from the group consisting of) comfilcon, etafilcon A, galyfilcon A, senofilcon A, nelfilcon A, hilafilcon, tetrafilcon A, vasurfilcon, vifilcon, and polymacon.

Conventional hydrogel contact lenses do not contain silicone containing components, and generally have higher water content, lower oxygen permeability and moduli than silicone hydrogels. Conventional hydrogels are prepared from monomeric mixtures predominantly containing hydrophilic monomers, such as 2-hydroxyethyl methacrylate ("HEMA"), N-vinyl pyrrolidone ("NVP") or polyvinyl alcohols. U.S. Pat. Nos. 4,495,313, 4,889,664 and 5,039,459 disclose the formation of conventional hydrogels. Conventional hydrogels may be ionic or non-ionic and include polymacon, etafilcon, nelfilcon, ocufilcon lenefilcon and the like. The oxygen permeability of these conventional hydrogel materials is typically below 20-30 barrers.

Silicon hydrogel formulations include balafilcon samfilcon, lotrafilcon A and B, delfilcon, galyfilcon, senofilcon A, B and C, narafilcon, comfilcon, formofilcon, riofilcon, fanfilcon, stenfilcon, somofilcon, kalifilcon and the like. "Silicone hydrogels" refer to polymeric networks made from at least one hydrophilic component and at least one silicone-containing component. Silicone hydrogels may have moduli in the range of 60-200, 60-150 or 80-130 psi, water contents in the range of 20 to 60%. Examples of silicone hydrogels include acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, including all of their variants, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9,156,934, 9,170,349, 9,244,196, 9,244,197, 9,260,544, 9,297,928, 9,297,929 as well as WO 03/22321, WO 2008/061992, and US 2010/0048847. These patents are hereby incorporated by reference in their entireties.

The contact lens polymer material is preferably a silicone hydrogel polymer. The silicone hydrogel may be selected from (or selected from the group consisting of) acquafilcon, asmofilcon, balafilcon A, comfilcon, delefilcon, enfilcon, galyfilcon, lotrafilcon, senofilcon, samfilcon, somofilcon, stenfilcon.

The compositions may also be useful for direct application to eye as a wetting or rewetting eye drop for providing relief to eye discomfort (e.g., burning sensations relating to the eye or general eye irritation).

The compositions described herein may be free of or substantially free of preservatives. The term "preservative" means compounds having antimicrobial properties. Examples of specific preservatives include, but are not limited to, 4-chlorocresol, 4-chloroxylenol, benzalkonium, benzalkonium chloride, benzoic acid, benzyl alcohol, chlorhexidine, chlorobutanol, imidurea, m-cresol, methylparaben, phenols 0.5%, phenoxyethanol, sorbate, propionic acid, propylparaben, sodium benzoate, sorbic acid, thimerosol, Stabilized Oxychloro Complex (SOC—99.5% chlorite, 0.5% chlorate, and with trace amounts of chlorine dioxide), polyquaternium compounds (such as polyquarternium-42 polyquarternium-1), perborate salts (e.g., sodium perborate, biguanide compounds (e g polyhexamethylene biguanide or polyaminopropyl biguanide).

The term "substantially free" as related to preservatives means that the preservative is present in the compositions of the present invention at a concentration of less than 2% (or about 2%), preferably less than 1.5% (or about 1.5%), and preferably less than 1% (or about 1%), preferably less than 0.5% (or about 0.5%), preferably less than 0.1% (or about 0.1%), preferably less than 0.05% (or about 0.05%), preferably less than 0.01% (or about 0.01%), preferably less than 0.005% (or about 0.005%) by weight of the total composition. Preferably, the compositions of the present invention are free of preservatives.

As mentioned above, contact lenses can be immersed in a composition of the present invention and stored in a suitable packaging container, preferably, a packaging container for single contact lens unit. Generally, a packaging container for the storage of a contact lens includes at least a sealing layer sealing the container containing an unused contact lens immersed in the composition of the present invention. The sealed container may be hermetically sealed packaging container. The hermetically sealed packaging container may be a blister pack in which a concave well containing a contact lens is covered by a metal or plastic sheet adapted for peeling in order to open the blister-pack. The sealed container may be formed from any suitable, generally inert packaging material providing a reasonable degree of protection to the lens. The packaging material may be formed of plastic material such as polyalkylene, PVC, polyamide, glass, glassy polymers and the like.

Any water soluble, demulcent (or demulcent like—e.g., having demulcent properties such as viscosity increasing capabilities) polymer may also be employed in the composition of this invention provided that it has no (or no substantial) detrimental effect on the contact lens being stored or on the wearer of the contact lens at the concentrations used in the composition of the present invention or on the eye (or on the region around the eye). Particularly useful components are those, which are water soluble, for example, soluble at the concentrations used in the presently useful liquid aqueous media. Suitable water soluble demulcent polymers include, but are not limited to, demulcent polymers, such as block copolymers of polyethyleneoxide (PEO) and polypropyleneoxide (PPO); polyvinyl alcohol, polyvinyl pyrrolidone; polyacrylic acid; polyethers such as polyethylene glycols (e.g., polyethylene glycol 300, polyethylene glycol 400) and polyethylene oxides; hyaluronic acid, and hyaluronic acid derivatives; chitosan; polysorbates such as polysorbate 80, polysorbate 60 and polysorbate 40); dextrans such as dextran 70; cellulosic derivatives such as carboxy methyl cellulose methylcellulose, hydroxyethylcellulose, hydroxypropylcellulose, and methyl ethyl cellulose; acyclic polyamides such as those having a weight average molecular weight of 2,500 to 1,800,000 Daltons as disclosed in U.S. Pat. No. 7,786,185 herein incorporated by reference in its entirety; salts of any of the above and mixtures of any of the above. Preferably, the block copolymers of PEO and PPO include poloxamers and poloxamines, including those disclosed in U.S. Pat. No. 6,440,366, herein incorporated by reference in its entirety. Preferably, the water-soluble demulcent polymer is selected from polyvinyl pyrrolidone, methyl ethyl cellulose, polyvinyl alcohol, polymethacrylic acid, carboxymethyl cellulose, glycerol, propylene glycol, 1,3-propanediol, polyethylene glycols, and mixtures thereof.

Lubricating agents may have molecular weights in excess of 100,000. When glycerol, propylene glycol and 1,3-propanediol are used as lubricating agents, they may have molecular weights lower than 100,000.

When any water soluble polymer is used in the packing solutions of the present invention, it may be included and present in amounts up to about 0.5, 1 or 2 weight % preferably between about 0.001 and about 2%, between about 0.005 and about 1%, between about 0.01 and about 0.5 weight %, or between about 100 ppm and about 0.5 weight %, all based upon the weight of total composition.

When any water soluble polymer is used in the direct application eye care formulation or eye drop of the present invention, it may be included and present in amounts up to about 2, 5 or 10 weight %, preferably between about 0.001 and about 10%, between about 0.005 and about 2%, between about 0.01 and about 0.5 weight %, or between about 100 ppm and about 2 weight %, all based upon the weight of total composition.

Without being limited by theory, it is believed that the water soluble demulcent polymer aids in preventing the ophthalmic device from sticking to its product packaging and may enhance the initial (and/or extended) comfort of the contact lens, packaged in the composition, when placed on the eye after removal from the packaging.

The demulcent polymer may be a cellulosic derivative. The cellulosic derivative may be present at concentrations of from about 0.002 to about 0.01, or preferably, from about 0.004 to about 0.006 by weight of the total composition of the present invention.

Various other materials may be included with the compositions described herein.

In the case of compositions of the present invention for direct application to the eye, surfactants may be included. Surfactants suitable for such use include, but are not limited to, ionic and nonionic surfactants (though nonionic surfactants are preferred), RLM 100, POE 20 cetylstearyl ethers such as Procol® CS20, poloxamers such as Pluronic® F68, and block copolymers such as poly(oxyethylene)-poly(oxybutylene) compounds set forth in U.S. Patent Application Publication No. 2008/0138310 entitled "Use of PEO-PBO Block Copolymers in Ophthalmic Compositions" filed Dec. 10, 2007 (which publication is herein incorporated by reference)

Surfactant may be present at concentrations of from about 0.01 to about 3%, preferably from about 0.01 to about 1%, preferably, from about 0.02 to about 0.5%, or preferably, from about 0.02 to about 0.1% by weight of the total composition of the present invention.

If desired, one or more additional components may be, optionally, included in the composition. Such optional component(s) are chosen to impart or provide at least one beneficial or desired property to the composition. Such additional, but optional, components may be selected from components that are conventionally used in ophthalmic device care compositions Examples of such optional components include (or, are selected from or selected from the group consisting of) cleaning agents (for example in direct application eye drops or cleaning [or eye care solution]), wetting agents, nutrient agents, therapeutic agent, sequestering agents, viscosity builders, contact lens conditioning agents, antioxidants, and the like and mixtures thereof. These optional components may each be included in the compositions in an amount effective to impart or provide the beneficial or desired property to the compositions such the beneficial or desired property is noticeable to the user. For example, such optional components may be included in the compositions in amounts similar to the amounts of such components used in other eye or ophthalmic device care compositions products.

All components in the ophthalmic solution of the present invention should be water-soluble. As used herein, water soluble means that the components, either alone or in combination with other components, do not form precipitates or gel particles visible to the human eye at the concentrations selected and across the temperatures and pH regimes common for manufacturing, sterilizing and storing the ophthalmic solution One or more therapeutic agent may also be incorporated into the ophthalmic solution. A wide variety of therapeutic agents may be used, so long as the selected active agent is inert in the presence of peroxides. Suitable therapeutic agents include those that treat or target any part of the ocular environment, including the anterior and posterior sections of the eye and include pharmaceutical agents, vitamins, nutraceuticals combinations thereof and the like. Suitable classes of active agents include antihistamines, antibiotics, glaucoma medication, carbonic anhydrase inhibitors, anti-viral agents, anti-inflammatory agents, non-steroid anti-inflammatory drugs, antifungal drugs, anesthetic agents, miotics, mydriatics, immunosuppressive agents, antiparasitic drugs, anti-protozoal drugs, combinations thereof and the like. When active agents are included, they are included in an amount sufficient to produce the desired therapeutic result (a "therapeutically effective amount").

Useful optional sequestering agents include, but are not limited to, disodium ethylene diamine tetraacetate (EDTA), alkali metal hexametaphosphate, citric acid, sodium citrate and the like and mixtures thereof.

Useful optional antioxidants include, but are not limited to, sodium metabisulfite, sodium thiosulfate, N-acetylcysteine, butylated hydroxyanisole, butylated hydroxytoluene and the like and mixtures thereof.

The method of packaging and storing a contact lens (or other ophthalmic device) includes at least incorporating the device into packaging where the device is immersed in the compositions described above. The method may include immersing the device in the composition prior to delivery to the customer/wearer, directly following manufacture of the contact lens. Alternately, the incorporation and storing of the device in the compositions (all in the packaging) may occur at an intermediate point before delivery to the ultimate customer (wearer) but following manufacture and transportation of the device in a dry state, wherein the dry device is hydrated by immersing the device in the compositions. Consequently, a package for delivery to a customer may comprise a sealed container containing one or more unused devices (e.g., contact lenses) immersed in the compositions. In one preferred embodiment, the steps for packaging the device in the composition of the present invention include:

(1) molding a device (e.g., contact lens) in a mold comprising at least a first and second mold portion, (2) removing the device from the mold portions and removal of unreacted monomer and processing agents (3) introducing the composition and the device into the packaging (or container), and (4) sealing the packaging.

The method may also include the step of sterilizing the contents of the packaging. Sterilization may take place prior to, or most conveniently after, sealing of the container and may be performed by any suitable method known in the art, e.g., by balanced autoclaving of the sealed container at temperatures of about 120° C. or higher. The packaging may be a plastic blister packaging (or package), including a recess for receiving a device and the composition, where the recess is sealed with lidstock prior to sterilization of the package contents. The term "lidstock" as used herein means the foil laminate composite material, including the aluminum foil and the other layers of polymers, that is heat sealed to cover the concave side of the blister.

The following examples are provided to enable one skilled in the art to practice the compositions and are merely illustrative of the invention. The examples should not be read as limiting the scope of the invention as defined in the claims.

EXAMPLES

Example 1

Table 1 shows compositions (i.e., test Exp1-Exp5) useful as solutions for storing or as packaging solution for ophthalmic devices (e.g., contact lenses) together with a control, each of which compositions can be prepared using conventional mixing technology.

TABLE 1

| | Weight % (phosphates corrected for hydrates) | | | | | |
|---|---|---|---|---|---|---|
| Component | EXP1 | EXP2 | EXP3 | EXP4 | EXP5 | Control |
| Deionized Water | 95.623 | 97.899 | 95.892 | 98.167 | 98.39 | 98.03 |
| Sodium Chloride | 0.84 | 0.84 | 0.84 | 0.84 | 0.84 | 0.84 |
| Boric Acid | 0.400 | 0.400 | 0.182 | 0.182 | 0 | 0.91 |
| Sodium Borate Decahydrate | 0.092 | 0.092 | 0.042 | 0.042 | 0 | 0.21 |
| monobasic sodium phosphate | 1.047 | 0.262 | 1.047 | 0.262 | 0.262 | 0 |
| dibasic sodium phosphate | 1.987 | 0.497 | 1.987 | 0.497 | 0.497 | 0 |
| EDTA | 0.010 | 0.010 | 0.010 | 0.010 | 0.010 | 0.01 |

Once prepared, each of the compositions of Table 1 was poured from its original specimen cup containers and filter sterilized through a 0.22 μm membrane using a 150-mL Analytical Filter Unit. The filtered individual compositions were then aseptically transferred into new individual sterile specimen cups for storage and testing.

The following microorganisms were used to assess microbial activity:

*Staphylococcus aureus* (Quanti-Cult Plus™) —ATCC 6538 (Remel Inc.)

*Escherichia coli* (BioBall® Multishot 550) —NCTC 12923 (ATCC 8739) (bioMérieux)

*Bacillus subtilis* (Quanti-Cult Plus™) —ATCC 6633 (Remel Inc.)

*Pseudomonas aeuroginosa* ((Quanti-Cult Plus™))
—ATCC 9027 (Remel Inc.)

*Candida albicans* ((Quanti-Cult Plus™))—ATCC 10231 (Remel Inc.)

*Salmonella typhimurium* (KWIK-STIK™) —ATCC 14028 (Microbiologics, Inc.)

*Aspergillus brasiliensis* ((Quanti-Cult Plus™)) —ATCC 16404 (Remel Inc.)

*Fusarium keratoplasticum* (KWIK-STIK™) —ATCC 36031 (Microbiologics, Inc.)

For the Quanti-Cult Plus and BioBall Multishot microorganisms, a solution 1:1 (microorganism sample to composition) was prepared for each composition of Table 1. An inoculum of 200 μl was used for spread plating in duplicate.

For the remaining KWIK-STIK™ microorganisms (i.e., in swab/pellet presentation), Microbiologics, Inc's instructions were followed for reconstitution. A stock solution was created using the disposable Hemocytometer 2-Chip instructions (Bulldog Bio) for general methods. Based on results obtained, serial dilutions were performed to obtain a countable inoculum for each buffer. Inoculum volume used for spread plating in duplicate was 100 μl.

Bacteria microorganisms were plated in tryptic soy agar (TSA) media and Yeast and Fungi in Sabouraud dextrose agar (SDA) or SDA with chloramphenicol. TSA plates were incubated for 24-72 hrs. at 30-35° C. and SDA plates were incubated for 48 hrs. to 4 days at 20-25° C.

Figure 9:
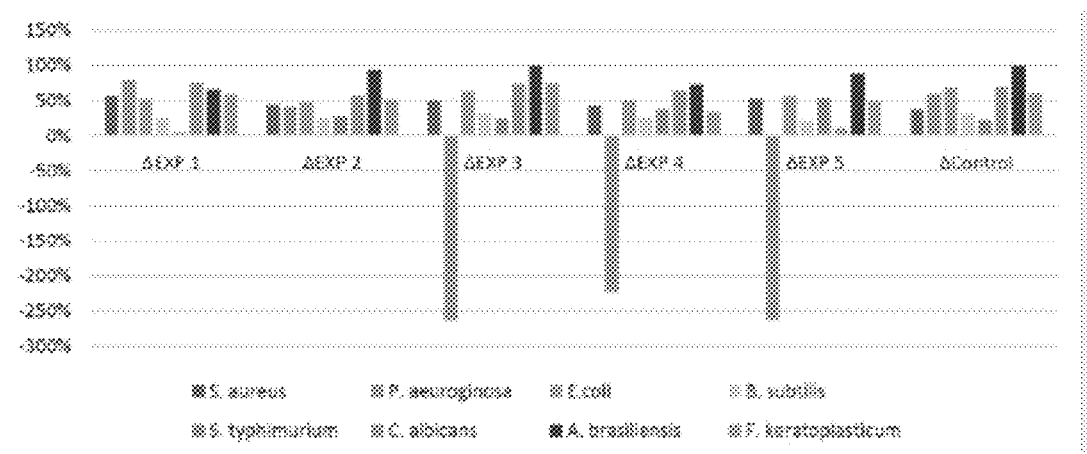
FIG. 9 is a graph (Chart 9) presents a comparison of microorganism reduction percentage on each EXP buffer vs the Control Buffer.

Quantitative analysis was performed on Day 0, 1 and 2. FIGS. 1-8 summarize the results obtained:

The data in FIGS. 1-8 demonstrate that the compositions of Table 1 provide bacteriostatic/fungistatic capability and bactericidal/fungicidal activity. FIG. 9 shows a comparison of microorganism reduction percentage for each of compositions EXP1-EXP5 vs the Control after 2 days. Compositions EXP1 and EXP2 show the most equivalent reduction pattern vs the Control and showed stasis (i.e., no increase from the initial count of inoculate microorganism) against all microorganisms after two days. However, composition EXP 2 shows the most consistent reduction % across all challenged microorganisms.

Example 2

The composition of Table 2 is useful as a solution for storing or as packaging solution for ophthalmic devices (e.g., contact lenses) is prepared as described below using conventional mixing technology.

TABLE 2

| Component | Weight % (the balance is water) |
|---|---|
| Boric acid | 0.30% |
| Sodium Chloride | 0.55% |
| Monobasic sodium phosphate*$H_2O$ | 0.081% |
| Dibasic sodium phosphate*$7H_2O$ | 0.67% |
| Disodium EDTA | 0.01% |
| MEC | 0.005% |
| Water | 98.384% |
| Composition Properties | |
| pH | 7.2* |
| Osmolality | 288* |

*Measured in the composition absent the presence of MEC and EDTA - it being recognized that due to the concentration of these components, such components alone or in combination would have minor impact on pH and osmolality relative to the remaining components.

Once prepared, the composition of Table 2 was poured from their original specimen cup containers and filter sterilized through a 0.22 μm membrane using a 250-mL Rapid Flow Filtration Unit. The filtered composition was then aseptically transferred into a sterile container for microbial growth testing on *Pseudomonas aeuroginosa* (Quanti Cult plus) —using *Pseudomonas aeuroginosa* ATTC culture type no. 9027).

*P. aeruginosa* (PA) Quanti-Cult plus was resuspended following manufacturers' instructions and an approximately 500 μL aliquot was spread plated onto two separate tryptic soy agar (TSA) plates. The plates were incubated at 30-35° C. for 2 days. An inoculating loop was used to resuspend the PA from the TSA plate surface in OmniPur WFI Quality Water, Sterile Filtered, Calbiochem (WFI).

The suspension was aseptically transferred with a sterile pipette into a 50 mL centrifuge tube.

The PA suspension was serially diluted with WFI quality sterile water and a hemocytometer (Disposable Hemocytometer, Bulldog Bio) was used to obtain a 1:1000 dilution containing a target population count of approximately $1.0 \times 10^7$ cells/mL.

Ten μL aliquot of the 1:1000 PA dilution was inoculated into 40 mL of the composition of Table 1 and a 1×PBS control solution to obtain a starting PA target population count of approximately 2500 CFU/mL. (PBS=AccuGENE 1× Phosphate Buffered Saline, 1.7 mM $KH_2PO_4$, 5 mM $Na_2HPO_4$, 150 mM NaCl, pH 7.4, Cat. No. 51225, LONZA). 100 μL of the PBS control solution was plated in triplicate onto TSA plates and incubated at 30-35° C. to determine the Day 0 PA delivery counts.

The PA inoculated composition of Table 2 and PBS control were stored at room temperature and at Day 1, Day 2 and Day 3 samples were spread plated (100-300 μL aliquots) in triplicate onto TSA. The plates were then incubated at 30-35° C. to quantitate the PA population counts following room temperature storage. The results for the composition in Table 1 is represented as "Exp. 7" in FIGS. 10-12.

Figure 10:
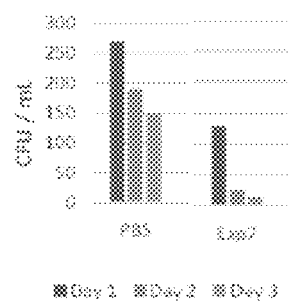
FIG. 10 is a graph showing *P. aeruginosa* CFU/mL Recovery Counts (1350 CFU/mL Day 0 Delivery Count in PBS) at Day 1, 2 and 3 of challenge with a certain composition of the present invention.
Figure 11:
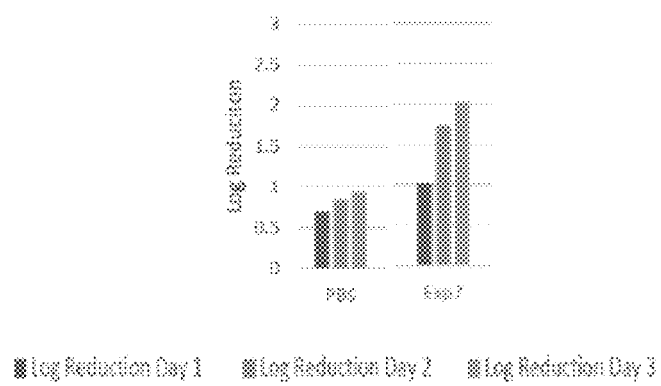
FIG. 11 is a graph showing *P. aeruginosa* Log reduction at Day 1, 2 and 3 of challenge with a certain composition of the present invention.
Figure 12:
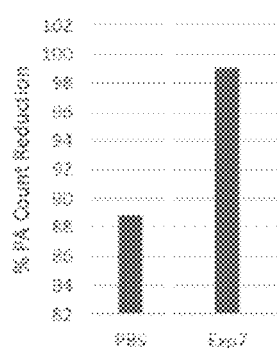
FIG. 12 is a graph showing percent count reduction of *P. aeruginosa* at Day 3 of challenge with a certain composition of the present invention.

As shown in FIGS. 10-12, the composition of Table 2 (shown as "Exp7") caused a greater reduction in PA population counts compared to the PBS control and, accordingly, provide the desired bacteriostatic properties. The reduction in PA population provided further evidence of prevention of increase from initial PA population count—or that bacteriostasis was achieved.

Example 3

The composition of Table 3 is useful as a solution for storing or as packaging solution for ophthalmic devices (e.g., contact lenses) is prepared as described below using conventional mixing technology.

TABLE 3

| Component | Weight % (the balance is water) |
|---|---|
| Boric acid | 0.29% |
| Sodium Chloride | 0.60% |
| Monobasic sodium phosphate*$H_2O$ | 0.081% |
| Dibasic sodium phosphate*$7H_2O$ | 0.67% |
| Disodium EDTA | 0.01% |
| MEC | 0.005% |
| Water | 98.394% |
| Composition Properties | |
| pH | 7.2 |
| Osmolality | 308 |

PREFERRED EMBODIMENTS

1. A composition, comprising:
   a. from about 0.1% w/v to less than or equal to about 0.80% w/v of a borate compound;
   b. from about 0.3% w/v to about 0.9% w/v of a phosphate compound; and
   c. ophthalmologically acceptable carrier
   wherein the concentration of the phosphate compound is at least about 1.5 times the amount of the borate compound on weight basis.
2. The composition of embodiment 1 wherein the composition comprises from about 0.2% w/v to less than or equal to 0.7% w/v of a borate compound.
3. The composition of embodiments 1 and/or 2 wherein the composition comprises from about 0.25% w/v to less than or equal to 0.45% w/v of a borate compound.
4. The composition of any of the preceding embodiments wherein the composition comprises from about 0.25% w/v to less than or equal to 0.4% w/v of a borate compound.
5. The composition of any of the preceding embodiments wherein the composition comprises from about 0.4% w/v to about 0.85% w/v of a phosphate compound.
6. The composition of any of the preceding embodiments wherein the composition comprises from about 0.5% w/v to about 0.8% w/v of a phosphate compound.
7. The composition of any of the preceding embodiments wherein the phosphate compound is at least about 2.5 times the amount of the borate compound on a weight basis.
8. The composition of any of the preceding embodiments wherein the ratio of the phosphate compound to the boric acid compound is from about 1.5:1 to about 3:1 on a weight basis.
9. The composition of any of the preceding embodiments wherein the ratio of the phosphate compound to the boric acid compound is from about 2:1 to about 3:1 on a weight basis
10. The composition of any of the preceding embodiments wherein the composition is substantially free of preservatives.
11. The composition of any of the preceding embodiments wherein the composition is free of preservatives.
12. The composition of any of the preceding embodiments further comprising a demulcent polymer.
13. The composition of any of the preceding embodiments wherein the demulcent polymer is selected from block copolymers of polyethyleneoxide (PEO) and polypropyleneoxide (PPO), polyvinyl alcohol, polyvinyl pyrrolidone, polyacrylic acid, polyethers, hyaluronic acid and hyaluronic acid derivatives, chitosan, polysorbates, dextrans, cellulosic derivatives, acyclic polyamides, salts thereof and mixtures thereof
14. The composition of any of the preceding embodiments further comprising additional components selected from cleaning agents, wetting agents, nutrient agents, therapeutic agent, sequestering agents, viscosity builders, contact lens conditioning agents, antioxidants, and the like and mixtures thereof.

What is claimed is:
1. A composition, comprising:
   a. from about 0.1% w/v to less than or equal to about 0.6% w/v of a borate compound;
   b. from about 0.3% w/v to about 0.9% w/v of a phosphate compound; and
   c. ophthalmologically acceptable carrier
   wherein the ratio of the phosphate compound to the borate compound is at least about 1.5:1 on a weight basis;
   and wherein the composition is free of preservatives.
2. The composition of claim 1 wherein the composition comprises from about 0.2% w/v to less than or equal to 0.5% w/v of a borate compound.
3. The composition of claim 2 wherein the composition comprises from about 0.25% w/v to less than or equal to 0.45% w/v of a borate compound.
4. The composition of claim 3 wherein the composition comprises from about 0.25% w/v to less than or equal to 0.4% w/v of a borate compound.
5. The composition of claim 1 wherein the composition comprises from about 0.4% w/v to about 0.85% w/v of a phosphate compound.
6. The composition of claim 5 wherein the composition comprises from about 0.5% w/v to about 0.8% w/v of a phosphate compound.
7. The composition of claim 1 wherein the ratio of the phosphate compound to the borate compound is at least about 2.5:1 on a weight basis.
8. The composition of claim 1 wherein the ratio of the phosphate compound to the boric acid compound is from about 1.5:1 to about 3:1 on a weight basis.
9. The composition of claim 1 wherein the ratio of the phosphate compound to the boric acid compound is from about 2:1 to about 3:1 on a weight basis.
10. The composition of claim 1 further comprising a demulcent polymer.
11. The composition of claim 10, wherein the demulcent polymer is selected from block copolymers of polyethyleneoxide (PEO) and polypropyleneoxide (PPO), polyvinyl alcohol, polyvinyl pyrrolidone, polyacrylic acid, polyethers, hyaluronic acid and hyaluronic acid derivatives, chitosan, polysorbates, dextrans, cellulosic derivatives, acyclic polyamides, salts thereof and mixture thereof.
12. The composition of claim 1 further comprising additional components selected from cleaning agents, wetting agents, nutrient agents, therapeutic agent, sequestering agents, viscosity builders, contact lens conditioning agents, antioxidants, and the like and mixtures thereof.

* * * * *